(12) United States Patent
van Helden

(10) Patent No.: US 8,474,746 B2
(45) Date of Patent: Jul. 2, 2013

(54) AIRCRAFT CONFIGURED FOR VERTICALLY ASCENDING AND LANDING

(75) Inventor: Aalbert Adrianus van Helden, The Hague (NL)

(73) Assignee: Van Helden Industrie B.V., Rotterdam (NL)

( * ) Notice: Subject to any disclaimer, the term of this patent is extended or adjusted under 35 U.S.C. 154(b) by 665 days.

(21) Appl. No.: 12/530,336

(22) PCT Filed: Mar. 10, 2008

(86) PCT No.: PCT/NL2008/050138
§ 371 (c)(1),
(2), (4) Date: Jan. 6, 2010

(87) PCT Pub. No.: WO2008/108655
PCT Pub. Date: Sep. 12, 2008

(65) Prior Publication Data
US 2010/0102163 A1    Apr. 29, 2010

(30) Foreign Application Priority Data

Mar. 8, 2007 (NL) ..................................... 2000529

(51) Int. Cl.
*B64B 1/58* (2006.01)
*B64B 1/20* (2006.01)

(52) U.S. Cl.
USPC ............................................. 244/25; 244/97

(58) Field of Classification Search
USPC ........................... 244/96–99, 5, 24–30, 158.3
See application file for complete search history.

(56) References Cited

U.S. PATENT DOCUMENTS

| 1,972,242 | A | * | 9/1934 | Morse .............................. 244/97 |
| 4,012,016 | A | | 3/1977 | Davenport |
| 4,967,983 | A | | 11/1990 | Motts |
| 6,119,979 | A | * | 9/2000 | Lee et al. ......................... 244/97 |
| 6,425,552 | B1 | * | 7/2002 | Lee et al. ......................... 244/97 |
| 7,278,607 | B2 | * | 10/2007 | Fuller .............................. 244/30 |
| 2005/0236519 | A1 | | 10/2005 | Handley |
| 2006/0049301 | A1 | | 3/2006 | Yam |

FOREIGN PATENT DOCUMENTS

| DE | 10007293 | 1/2002 |
| GB | 1548884 | 7/1979 |

OTHER PUBLICATIONS

International Search Report dated May 23, 2008, in PCT application.

* cited by examiner

*Primary Examiner* — Timothy D Collins
*Assistant Examiner* — Brian M O'Hara
(74) *Attorney, Agent, or Firm* — Young & Thompson

(57) ABSTRACT

An aircraft which is configured for vertically ascending and landing, includes at least two wings (2a, 2b, 4a, 51, 4b, 52), a space (2c, 4c) for the generating during operation of climbing power, and an intermediate portion (3), the intermediate portion (3) being provided with thrust motors (6), and the space (2c, 4c) for the generating during operation of climbing power being provided with a quantity of lifting power units (HV). Each lifting power unit includes a first variable volume (V1) for the storage of an amount of relatively light gas which is lighter than atmospheric air, and is configured for the controllable adjustment of an upward force or lifting power by the variable volume taken up by the amount of relatively light gas.

11 Claims, 5 Drawing Sheets

AIRCRAFT CONFIGURED FOR VERTICALLY ASCENDING AND LANDING

BACKGROUND OF THE INVENTION

1. Field of the Invention

The present invention relates to an aircraft according to the preamble of claim 1.

2. Description of the Related Art

DE 100 07 293 A1 discloses a Zeppelin-type airship having a modular design. Like an air balloon, this airship is able to select its altitude by means of the climbing power of a gas which is stored in the airship and is lighter than atmospheric air. Horizontal displacement can be carried out with the aid of motors positioned on the underside of the airship. The motors which are provided are rotatable in order to hold the airship in a given position. Owing to the air-balloon character of the airship, a relatively large component of the airship is necessary as a volume for the gas supplying climbing power. Furthermore, the selected suspension of the propulsion means limits the airship during landing.

BRIEF SUMMARY OF THE INVENTION

An object of the present invention is to provide an aircraft configured for a vertical start and landing that eliminates the above-mentioned problem.

This object is achieved by an aircraft configured for a vertical start and landing according to claim 1.

In an advantageous manner, the present invention allows the aircraft to utilize a vertical start and landing, whereas in the case of a forward velocity the shape of the wing contributes to the lifting power. The aircraft is thus "able to remain in the air" without being fully dependent on the lifting power of a volume comprising gas which is "lighter than air".

BRIEF DESCRIPTION OF THE DRAWINGS

The invention will be described hereinafter in greater detail with reference to individual drawings representing exemplary embodiments of the invention. These embodiments are intended exclusively for illustrative purposes and not to limit the inventive idea which is defined by the claims.

In the drawings.

DETAILED DESCRIPTION OF THE PREFERRED EMBODIMENTS

Figure 1:
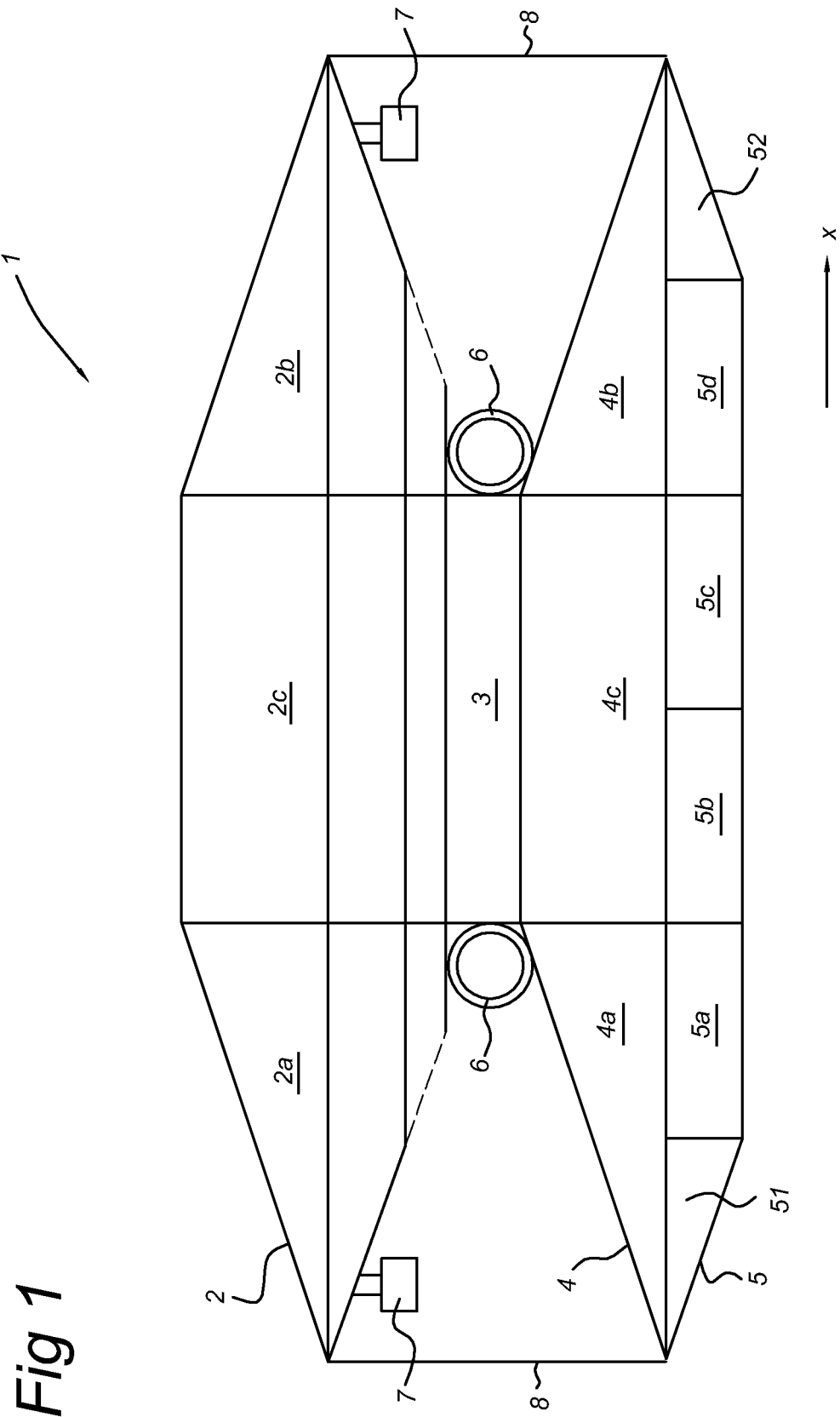
FIG. 1 is a front view of the aircraft according to the present invention.

FIG. 1 is a front view of the aircraft according to the present invention.

The aircraft 1 according to the present invention comprises an upper portion 2, an intermediate portion 3 and a lower portion 4, 5.

The upper portion 2 comprises a left-hand upper wing 2a, a right-hand upper wing 2b and a first central portion 2c.

The lower portion 4, 5 comprises a left-hand lower wing 4a, 51, a right-hand lower wing 4b, 52 and a second central portion 4c.

The aircraft further comprises in the lower portion 4, 5 in the width direction X one or more compartments 5a, 5b, 5c, 5d for useful cargo. The compartments for useful cargo 5a, 5b, 5c, 5d are located on the lower side of the lower portion 4, 5.

The upper portion 2 is connected to the lower portion by means of intermediate portion 3.

On the intermediate portion 3 between the upper portion 2 and the lower portion 4, thrust motors 6 for the producing of thrust force are located between the wings 2a, 2b of the upper portion 2 and the wings 4a, 51, 4b, 52 of the lower portion 4, 5.

Control motors 7 which are adjustable to control a direction of the aircraft 1 are also located in the intermediate portion control.

Figure 2:
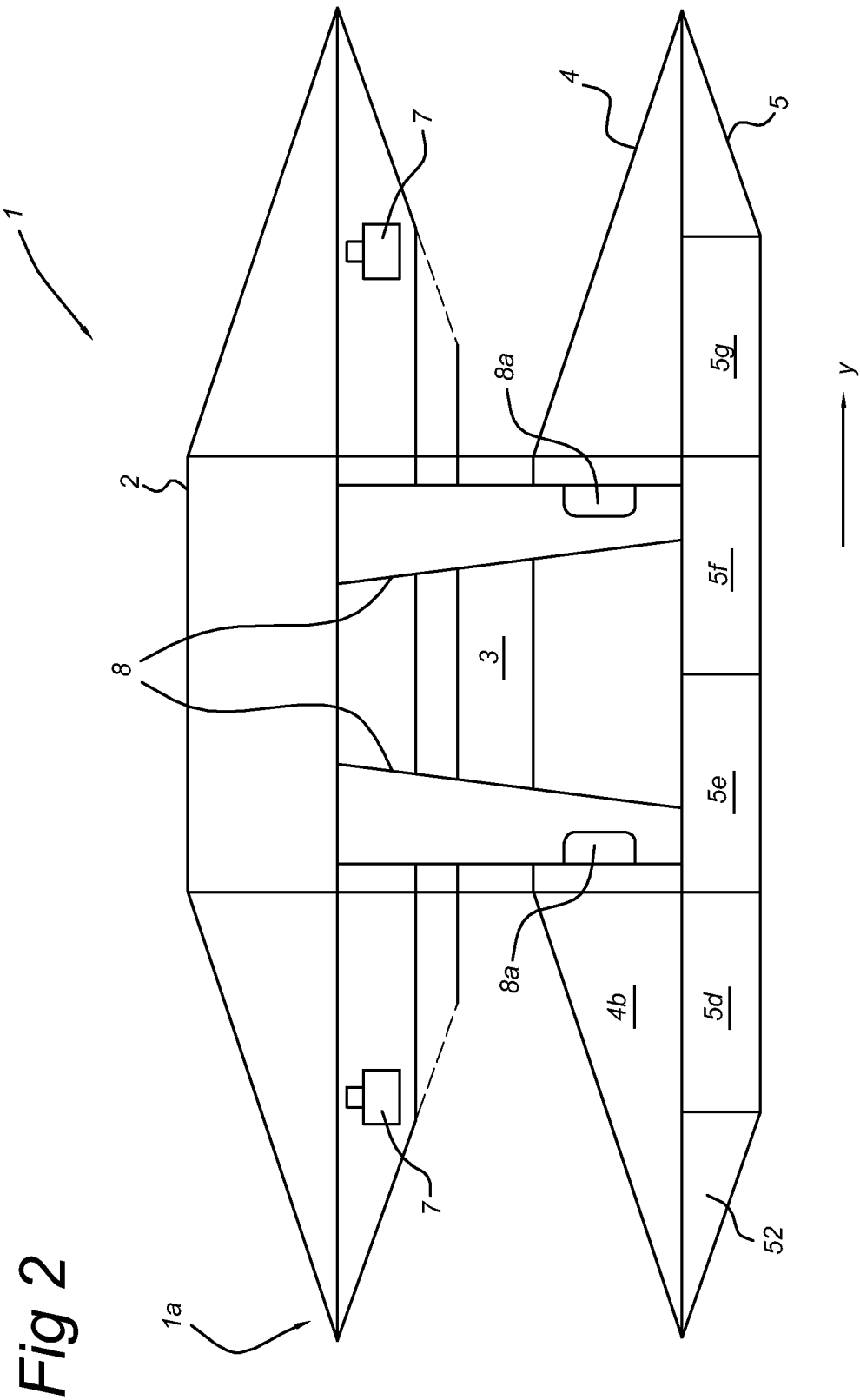
FIG. 2 is a side view of the aircraft according to the present invention.

Control surfaces 8, which will be described in greater detail with reference to FIG. 2, are also located on the lateral surfaces of the aircraft 1 between upper portion 2 and lower portion 4.

Optionally the thrust motors 6 can also be adjustable in order to be able to adjust a direction for the thrust force and can comprise both propellers and turbines.

In a preferred embodiment the thrust motors 6 are driven electrically.

FIG. 2 is a side view of the aircraft according to the present invention.

The side view of the aircraft 1 has almost the same form as the front view.

In a longitudinal direction Y of the aircraft the lower portion 4, 5 can comprise one or more compartments 5d, 5e, 5f, 5g for useful cargo.

Furthermore, one or more drives 6 can be positioned in the longitudinal direction Y 6 on the intermediate portion 3.

The control surfaces 8 are located between the upper and lower portions and provided with a rudder 8a. Two control surfaces 8 are in this case attached to one side of the aircraft, although it is conceivable for a single control surface to be present.

Optionally the aircraft is provided with horizontal wings (not shown), for obtaining additional lift during flight. Wings of this type can be foldable between the upper and lower portions or can be extendable from either the upper portion or the lower portion.

Figure 3:
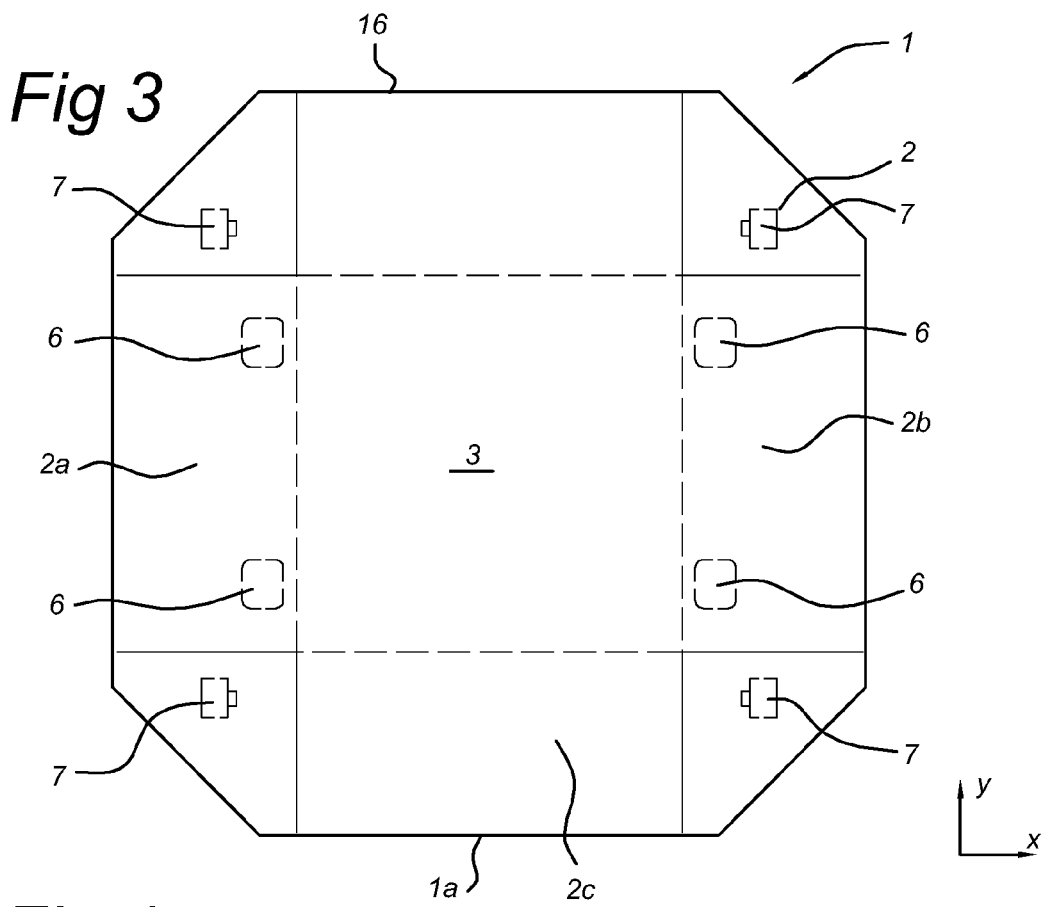
FIG. 3 is a plan view of the aircraft according to the present invention.

FIG. 3 is a plan view of the aircraft according to the present invention.

The plan view shows that the left-hand and right-hand upper wings 2a, 2b comprise on a front 1a and a back 1b corner pieces extending obliquely with respect to the width and longitudinal directions X, Y. The left and right-hand lower wings 4a, 51 and 4b, 52 also have a similar shape.

The circumference of the intermediate portion 3 and the drives 6 are indicated by broken lines.

In the embodiment shown the length of the aircraft is substantially equal to the width. It is however conceivable for the length to be greater than the width of the aircraft 1.

The compartments 5a-5g for useful cargo can comprise both passenger spaces and cargo spaces.

In one embodiment the compartments 5a-5g can be provided with a roll-on/roll-off system for the changing of loads and/or supplies of the aircraft.

Figure 4:
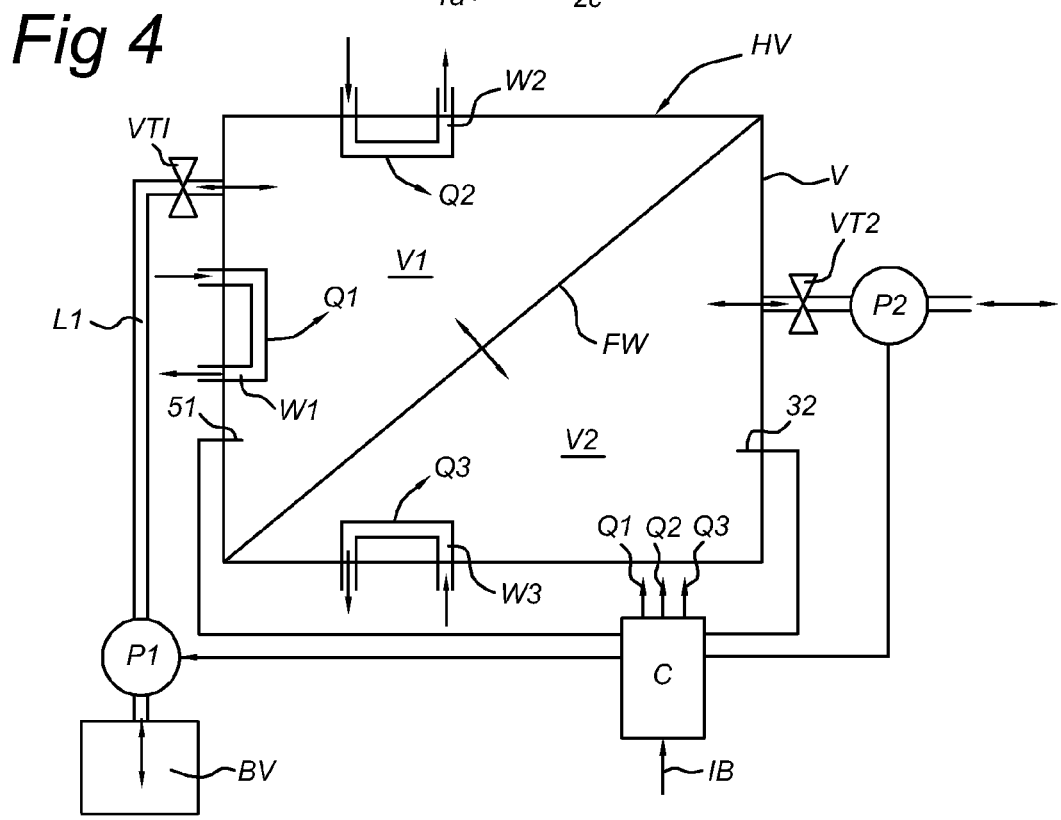
FIG. 4 is a cross section of a lifting power unit.

FIG. 4 is a cross section of a lifting power unit.

The aircraft according to the present invention is configured to be able to ascend and land vertically on the basis of the use of lifting power, wherein a limited volume comprising a first gas having a relatively low density can rise in a second gas having a relatively higher density.

In the constructions of the upper portion 2 and of parts of the lower portion 4, 5 comprising no compartments 5a-5g for useful cargo, a quantity of lifting power units HV are located with which an upward force or lifting power of an amount of relatively light gas can be controllably adjusted.

The aircraft according to the present invention is thus able to ascend and to land vertically. The aircraft is thus advantageously able to utilize landing and start locations having a relatively small surface area.

Owing to the upper and lower wings 2a, 2b, 4a, 51 and 4b, 52, an upward force can be generated on the aircraft in the event of forward movement in a substantially horizontal plane, thus providing climbing power.

In this way the aircraft differs from a Zeppelin-type aircraft which is fully dependent on the lifting power of a volume comprising gas which is "lighter than air" in order "to be able to remain in the air".

The aircraft according to the present invention is provided with a system which can precisely control the upward force. In principle it is sufficient if the system can cause the aircraft to ascend vertically to a low height after which forward velocity can increase the distance between the aircraft and surface of the earth. However, the controlled departure of the aircraft from the surface of the earth is influenced by the loading of the aircraft and possibly also by weather conditions. The load distribution can also play a part.

A lifting power unit HV comprises a gastight total volume V, a first pump P1, a second pump P2, a storage vessel BV, one or more heat exchangers W1, W2, W3 and a lifting power controller C.

In this connection the term "pump" refers to an installation which can bring about a rise in pressure or reduction in pressure in a volume by means of the conveyance of gas. A pump can be a compressor, but in some cases also a fan.

The gastight total volume V can be distributed by means of a flexible or movable gastight wall FW into a first volume V1 and a second volume V2. The first volume V1 is configured for containing an adjustable amount of the first gas having a relatively low density. The second volume V2 is configured for containing an adjustable amount of the second gas having a relatively high density.

The first pump P1 is connected to the first volume V1 via a pipe L1. The pump is also connected to the storage vessel BV. The connection between the first pump and the first volume V1 comprises a valve VT1. The storage vessel BV is used to store the first gas outside the first volume so the first gas can be reused on discharge from the first volume V1.

The second pump P2 is connected to the second volume V2. The connection between the second pump P2 and the second volume V2 comprises a second valve VT2.

By allowing the first volume V1 to increase relative to the second volume V2, the second gas in the second volume being displaced by the first gas in the first volume, the upward force of the total volume can increase. Conversely, by allowing the second volume V2 to increase and by allowing the first gas to escape from the first volume to the storage vessel under the pressure of the second volume, the upward force can decrease.

The combination of the first and second pumps P1, P2 (with control of the valves) is thus configured for the adjustment of a ratio between the first volume V1 comprising the amount of first gas having the low density and the second volume V2 comprising the amount of second gas having the high density within the gastight total volume V.

This ratio is adjusted so as to correspond to a desired upward force or lifting power.

In the embodiment shown the second pump P2 is provided with a connection to atmospheric air for the use of air as the second gas.

Regulating the size of the first and second volumes V1, V2 and the respective pressure therein with the aid of the first and second pumps P1, P2 and under control of the valves allows the effective density of the gastight total volume V to be controlled. The flexible wall FW is configured to undergo deformation so the volumes V1, V2 within the total volume V can each assume the size imposed by the respective relative internal gas pressure.

The first volume V1 also comprises one or more heat exchangers to be able to adapt the temperature of the first gas (and thus the density of the gas) within the volume by the supply and discharge of heat (via a suitable transfer medium). For example, a first heat exchanger W1 is used to supply heat Q1 to the first gas. A second heat exchanger W2 can be used, by contrast, to discharge heat Q2.

Similarly, the second volume V2 comprises one or more further heat exchangers W3 to heat or to cool the second gas.

Heat can be supplied to the respective heat exchangers from an energy supply system on board the aircraft. This will be described hereinafter in greater detail. For the discharge of heat, cooling to the outside air could for example be used.

The lifting power unit HV is controlled by the lifting power controller C. The lifting power controller C is connected to the first pump P1, the second pump P2 and heat exchangers W1, W2, W3 for the controlling of their respective functions. The lifting power controller C can control the first and/or second pump P1, P2 to adapt the first volume V1 of the first gas or the volume V2 of the second gas respectively as described above.

The lifting power controller C can control one or more of the heat exchangers to supply/discharge heat to/from the first and/or second volume.

For this control of pumps and heat exchangers, the lifting power controller C is also connected to at least a first sensor S1 in the first volume V1 and to at least a second sensor S2 in the second volume V2 for the receiving of signals from the respective sensors to be able to determine and to be able to control one or more relevant physical parameters (such as, for example, pressure and temperature) of the first and/or second gas.

The lifting power controller C also comprises a control input IB for the receiving of control data from a central control system of the aircraft. This will be described hereinafter.

In the embodiment shown the lifting power unit HV is provided with pumps specifically for the regulation of the first and second volumes of a single lifting power unit HV. It is however conceivable for the first pump P1 and/or the second pump P2 to be configured to be used in a plurality of the amount of lifting power units in the aircraft. In that case the first or second pump respectively is connected to each of the amount of lifting power units via a distribution pipe. A specific lifting power unit can then be controlled by controlling first and second valves VT1, VT2 which are positioned at the connections to the first or second volume respectively of the gastight total volume V of said specific lifting power unit.

Figure 5:
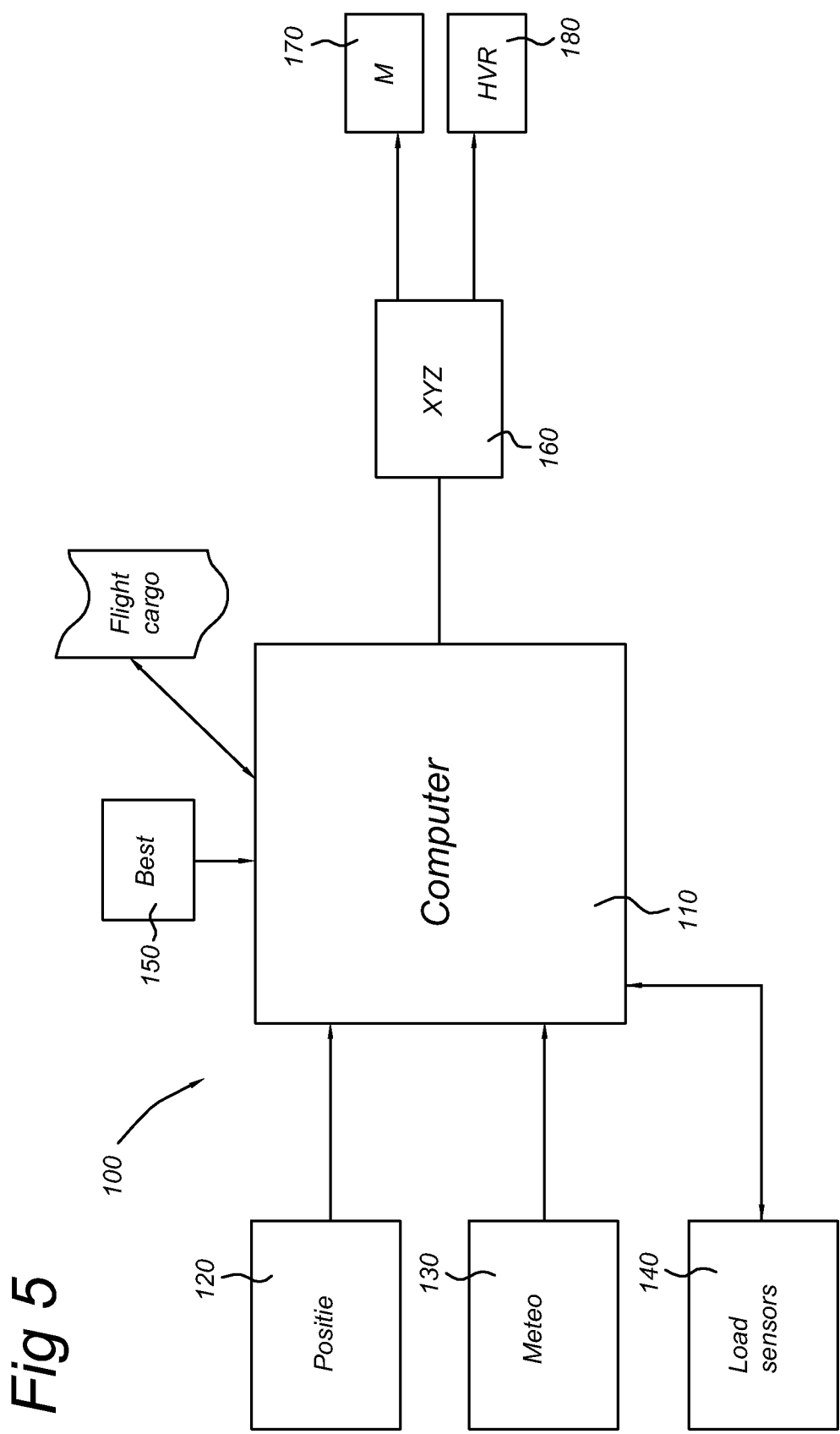
FIG. 5 is a block diagram of a controller of the aircraft according to the present invention.

FIG. 5 is a block diagram of a control system of the aircraft according to the present invention.

In one embodiment the control system 100 of the aircraft according to the present invention comprises a computer 110, a position sensor 120, a meteo sensor 130, a load sensor 140, a navigation module 150, a position regulating unit 160, a motor controller 170 and a lifting power regulating unit HVR.

The computer 110 is connected to the position sensor 120 for obtaining position information (for example a length, width and height coordinate) of the aircraft. The computer 110 is further connected to the meteo sensor 130 for obtaining meteo data such as local wind speed, air pressure, etc. The computer 110 is further connected to the load sensor 140 for obtaining data concerning loading of the construction of the aircraft by the load. The computer 110 is additionally connected to the navigation module 150 to be able to propel the aircraft.

On the basis of data coming from one or more of the position sensor 120, meteo sensor 130, load sensor 140 and navigation module 150, the computer 110 can perform a calculation about trimming data of the aircraft and possible adaptation thereof. The trimming relates to the stability of the aircraft.

The computer 110 is connected to a position regulating unit 160 which uses the trimming data in order, on the one hand, to control the lifting power of the amount of lifting power units HV via lifting power regulating unit HVR and, on the other hand, to control the thrust motors 6 via the motor controller 170.

The motor controller 170 is connected (not shown in the present document) to the thrust motors 6 to regulate the power supplied to and direction of propulsion of said thrust motors.

The lifting power regulating unit HVR is connected to the one or more lifting power controllers C in order to regulate the one or more lifting power controllers C so each of the amount of lifting power units can supply the desired amount of lifting power. Preferably, the desired amount of lifting power is dependent on the loading and load distribution of the aircraft.

It will be noted that the control system 100 can regulate the trimming dynamically as a result of variation of, for example, weather conditions. The trimming can also change as a result of the fact that the upper and lower wings make a (variable) contribution on (variation of) forward velocity to the climbing power of the aircraft. The trimming can also change during a loading/release operation by varying the loading/load distribution of the aircraft.

In the embodiment shown the computer 110, the position sensor 120, the meteo sensor 130, the load sensor 140, the navigation module 150, the position regulating unit 160, the motor controller 170 and the lifting power regulating unit HVR are represented as separate modules. As is known to a person skilled in the art, it is conceivable for all modules to be integrated in a single computer. The modules can be designed in software, but also in hardware or in a combination of hardware and software.

The computer can be designed as any desired control computer which is suitable for determining and regulating the trimming as explained hereinbefore.

Figure 6:
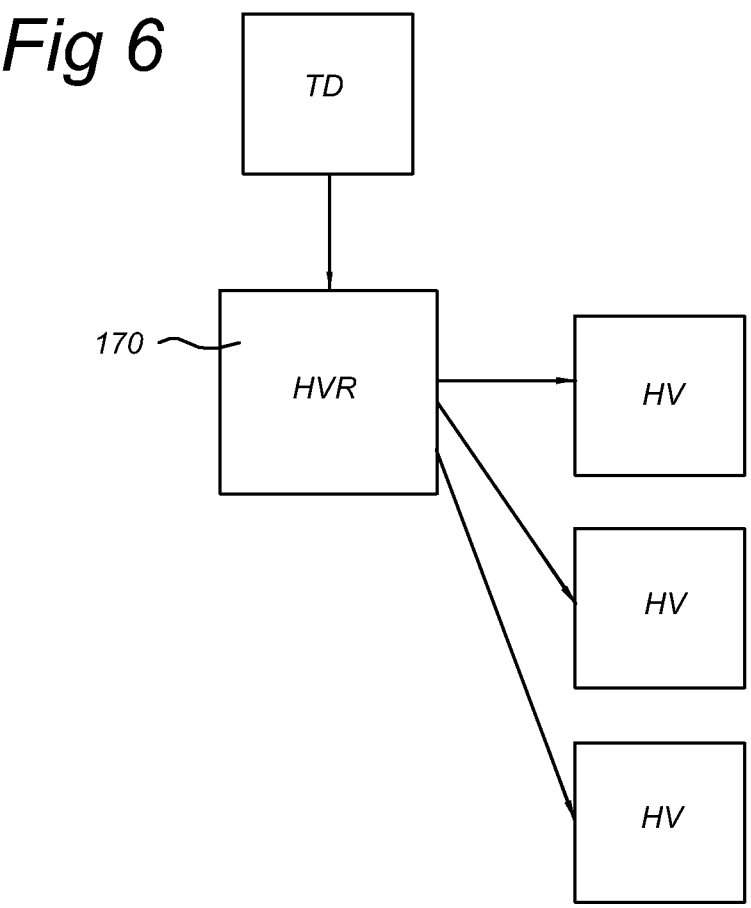
FIG. 6 is a diagram of a lifting power regulator of the aircraft according to the present invention.

FIG. 6 is diagram of a lifting power regulator of the aircraft according to the present invention.

The lifting power regulating unit HVR is connected to the amount of lifting power units HV for the forwarding of control signals to each lifting power controller C. The lifting power regulating unit HVR is configured for the receiving from the position regulating unit 150 of trimming data TD which relate to the lifting power such as can be generated distributed over the amount of lifting power units during operation.

The lifting power regulating unit HVR is configured to send on the basis of the trimming data TD to the controller C of each lifting power unit HV a lifting power signal which is associated with the desired lifting power. The controller C of each lifting power unit HV is configured for adjusting on the basis of the received lifting power signal a lifting power corresponding thereto for the respective lifting power unit.

Figure 7:
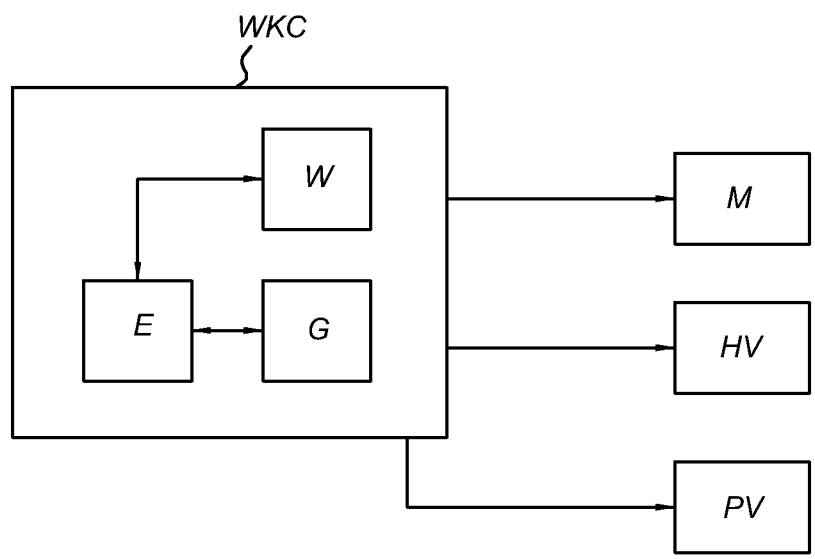
FIG. 7 is a diagram of a unit for supplying energy to the aircraft according to the present invention.

FIG. 7 is a diagram of a unit for supplying energy to the aircraft according to the present invention.

The aircraft according to the present invention comprises an energy supply system WKC which is preferably located in the intermediate portion 3 of the aircraft. The energy supply system WKC is configured to be able to supply electrical energy and thermal energy within the aircraft 1.

The energy supply system WKC is in the embodiment shown a total energy plant comprising a drive motor E, an electric generator G and a heat exchanger W.

The drive motor E is coupled to the electric generator G for the generating during operation of electrical energy. The drive motor E is also coupled to the heat exchanger W to absorb released heat during operation of the motor E.

The energy supply system WKC is coupled to the thrust motors 6 for the supplying during operation of electrical energy to the thrust motors 6 (under control of the motor controller 160).

In addition, the energy supply system WKC is coupled to the one or more lifting power units HV for the supplying of electrical energy and of thermal energy for use in the heat exchangers W1, W2, W3 of each lifting power unit HV (under control of the lifting power regulating unit HVR and/or the lifting power controller C).

The energy supply system WKC can also be coupled to the compartments for useful cargo for the purposes of energy supply.

In a first aspect the present invention provides an aircraft configured for vertically ascending and landing, comprising at least two wings 2a, 2b, 4a, 51, 4b, 52, a space 2c, 4c for the generating during operation of climbing power, and an intermediate portion 3, the intermediate portion 3 being provided with thrust motors 6, and the space 2c, 4c for the generating during operation of climbing power being provided with a quantity of lifting power units HV, each lifting power unit comprising a first variable volume V1 for the storage of an amount of relatively light gas which is lighter than atmospheric air, and the lifting power unit being configured for the controllable adjustment of an upward force or lifting power by means of the variable volume taken up by the amount of relatively light gas.

In a further aspect the invention provides an aircraft as described in the first aspect, each lifting power unit comprising a gastight total volume V in which the first variable volume V1 and a second variable volume V2 are received, the second variable volume being configured for the storage of an amount or gas which is heavier than the relatively light gas, the first variable volume being separated from the second variable volume by a flexible wall FW, and the lifting power unit being configured for the adjustment of a ratio between the first variable volume and the second variable volume within the gastight total volume, the ratio corresponding to a desired lifting power.

In a further aspect the invention provides an aircraft as described hereinbefore, each lifting power unit comprising a first pump P1, a second pump P2 and a storage vessel BV, the first pump being configured for the adjustment of the first variable volume, the second pump being configured for the adjustment of the second variable volume, and the storage vessel being configured for the storage of the relatively light gas on expulsion thereof from the first variable volume.

In a still further aspect the invention provides an aircraft, as described hereinbefore, the first variable volume V1 comprising at least a first heat exchanger W1, W2 which is configured for exchanging heat Q1, Q2 with the relatively light gas in the first variable volume.

In another aspect the invention also provides an aircraft as described hereinbefore, the second variable volume V2 comprising at least a further heat exchanger W3 which is configured for exchanging heat (Q3) with the relatively heavier gas in the second variable volume.

In addition, the invention provides in one aspect an aircraft as described hereinbefore, each lifting power unit comprising a lifting power controller C, the lifting power controller being connected to the first pump P1, the second pump P2 for the controlling of one or more of the first and second pumps to adapt the first variable volume V1 or the second variable volume V2 respectively.

In a further aspect the invention provides an aircraft as described hereinbefore, the lifting power controller also being connected to the heat exchangers W1, W2, W3 for the controlling of one or more of the heat exchangers.

The invention also provides in one aspect an aircraft as described hereinbefore, an at least first sensor S1 being positioned in the first variable volume, an at least second sensor S2 being positioned in the second variable volume, the at least first sensor and at least second sensor being connected to the lifting power controller C, each of the first and second sensors being configured for the measuring of one or more relevant physical parameters such as, for example, pressure and temperature of the relatively light gas in the first variable volume and/or the relatively heavy gas in the second variable volume, and the lifting power controller being configured for the receiving of signals from the respective sensors and to control based on the measured relevant physical parameters the desired lifting power.

In one aspect the invention further provides an aircraft as described hereinbefore, the lifting power controller C of each lifting power unit being connected to an on-board computer 110, HVR, the lifting power controller being configured for the receiving from the on-board computer of a lifting power control signal for the adjustment of the desired lifting power.

In another aspect the invention provides an aircraft as described hereinbefore, the on-board computer 110, HVR being configured for determining the lifting power of each of the lifting power units.

In still another aspect the invention provides an aircraft as described hereinbefore, the on-board computer 110, HVR being connected to at least one of a position sensor 120, a meteo sensor 130 and a load sensor 140 for the receiving of sensor signals from the at least one sensor 120, 130, 140; the position sensor being configured for the generating of a position signal for a position of the aircraft, the meteo sensor being configured for the generating of a weather condition signal, the load sensor being configured for the generating of a load signal of the construction of the aircraft by a load and the on-board computer being configured to determine on the basis of the one or more sensor signals trimming data TD for the purposes of trimming of the aircraft.

In a further aspect the invention provides an aircraft as described hereinbefore, the on-board computer being configured to determine and to control on the basis of trimming data a desired lifting power.

In another further aspect the invention provides an aircraft as described hereinbefore, the on-board computer being configured to determine and to control a distribution of lifting power over the amount of lifting power units.

In a still further aspect the invention provides an aircraft as described hereinbefore, the on-board computer being configured to determine and to control on the basis of trimming data a thrust force and a direction of propulsion of the thrust motors 6.

The invention claimed is:

1. An aircraft configured for vertically ascending and landing, comprising:
   at least two wings for generating upward force during forward movement;
   a space for generating lifting power that contributes to an overall climbing power of the aircraft, the space being provided with a quantity of lifting power units, each lifting power unit comprising
      a first variable volume for the storage of an amount of relatively light gas which is lighter than atmospheric air, each lifting power unit being configured for the controllable adjustment of the lifting power by means of the first variable volume taken up by the amount of relatively light gas,
      a gastight total volume in which the first variable volume and a second variable volume are received, the second variable volume being configured for the storage of an amount of gas which is heavier than the relatively light gas, each lifting power unit being configured for the adjustment of a ratio between the first variable volume and the second variable volume within the gastight total volume, the ratio corresponding to a desired lifting power,
      a flexible wall separating the first variable volume from the second variable volume
      a first pump configured for the adjustment of the first variable volume,
      a second pump configured for the adjustment of the second variable volume,
      a storage vessel configured for the storage of the relatively light gas on expulsion thereof from the first variable volume,
      a lifting power controller connected to the first pump and the second pump for the controlling of one or more of the first and second pumps in order to adapt the first variable volume or the second variable volume respectively, the lifting power controller being connected to an on-board computer, the lifting power controller being configured for the receiving from the onboard computer of a lifting power control signal for the adjustment of the desired lifting power, the on-board computer being connected to at least one of a position sensor configured for the generating of a position signal for a position of the aircraft, a meteo sensor configured for the generating of a weather condition signal and a load sensor configured for the generating of a load signal of the construction of the aircraft by a load, the on-board computer configured for the receiving of sensor signals from the at least one sensor, the on-board computer being configured to determine, on the basis of the one or more sensor signals, trimming data for the purposes of trimming of the aircraft, the on-board computer being configured to regulate the trimming dynamically based on the upward force generated by the at least two wings contributing to the climbing power of the aircraft; and
   an intermediate portion provided with thrust motors.

2. The aircraft as claimed in claim 1, wherein the first variable volume comprises at least a first heat exchanger which is configured for exchanging heat with the relatively light gas in the first variable volume.

3. The aircraft as claimed in claim 2, wherein the second variable volume comprises at least a second heat exchanger which is configured for exchanging heat with the relatively heavier gas in the second variable volume.

4. The aircraft as claimed in claim 1, wherein the second variable volume comprises at least a heat exchanger which is configured for exchanging heat with the relatively heavier gas in the second variable volume.

5. The aircraft as claimed in claim 1, wherein the lifting power controller is also connected to one or more heat exchangers for the controlling of the one or more heat exchangers.

6. The aircraft as claimed in claim 1, wherein an at least first sensor is positioned in the first variable volume, an at least second sensor is positioned in the second variable volume, the at least first sensor and at least second sensor are connected to the lifting power controller, each of the first and second sensors being configured for the measuring of one or more relevant physical parameters including one or more of pressure and temperature of the relatively light gas in the first variable volume and/or the relatively heavy gas in the second variable volume, the lifting power controller being configured for the receiving of signals from the respective sensors and configured to control the desired lifting power based on the measured relevant physical parameters.

7. The aircraft as claimed in claim 1, wherein the on-board computer is configured for determining the lifting power of each of the lifting power units.

8. The aircraft as claimed in claim 1, wherein the on-board computer is configured to determine and to control on the basis of the trimming data a desired lifting power.

9. The aircraft as claimed in claim 8, wherein the on-board computer is configured to determine and to control a distribution of lifting power over the amount of lifting power units.

10. The aircraft as claimed in claim 1, wherein the on-board computer is configured to determine and to control on the basis of the trimming data a thrust force and a direction of propulsion of the thrust motors.

11. The aircraft as claimed in claim 1, wherein the on-board computer is configured to regulate the trimming dynamically as a result of the desired lifting power from a lift generating gas volume including the first variable volume and the second variable volume having the adjusted ratio within the gastight total volume in combination with the upward force from the at least two wings that contribute to the climbing power of the aircraft.

\* \* \* \* \*

UNITED STATES PATENT AND TRADEMARK OFFICE
CERTIFICATE OF CORRECTION

PATENT NO. : 8,474,746 B2  Page 1 of 1
APPLICATION NO. : 12/530336
DATED : July 2, 2013
INVENTOR(S) : Aalbert Adrianus van Helden It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 783 days.

Signed and Sealed this
Eighth Day of September, 2015

Michelle K. Lee
*Director of the United States Patent and Trademark Office*